United States Patent
Bruce et al.

(10) Patent No.: US 9,199,186 B2
(45) Date of Patent: Dec. 1, 2015

(54) UNDERDRAIN FLUME PLATE

(75) Inventors: Daniel E. Bruce, Murrysville, PA (US);
John L. Geibel, Butler, PA (US);
Christopher J. Ball, Cranberry Township, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 422 days.

(21) Appl. No.: 13/237,394

(22) Filed: Sep. 20, 2011

(65) Prior Publication Data

US 2012/0103897 A1   May 3, 2012

Related U.S. Application Data

(60) Provisional application No. 61/384,955, filed on Sep. 21, 2010.

(51) Int. Cl.
*F16L 5/00* (2006.01)
*B01D 24/42* (2006.01)
*B01D 24/24* (2006.01)

(52) U.S. Cl.
CPC ............. *B01D 24/42* (2013.01); *B01D 24/24* (2013.01); *Y10T 29/49826* (2015.01)

(58) Field of Classification Search
USPC .............. 248/56, 49, 65, 121, 126, 200, 300, 248/309.1, 346.01; 210/232, 293, 541; 52/295; 29/428
See application file for complete search history.

(56) References Cited

U.S. PATENT DOCUMENTS

| | | | |
|---|---|---|---|
| 1,892,842 A | 1/1933 | Kimberling | |
| 2,378,239 A | 6/1945 | Myron | |
| 2,401,121 A | 5/1946 | Thoresen | |
| 2,745,553 A | 5/1956 | Riddick | |
| 3,053,494 A * | 9/1962 | Stoll | 248/228.3 |
| 3,468,422 A | 9/1969 | Camp | |
| 3,615,019 A | 10/1971 | Early, Jr. | |
| 3,695,324 A * | 10/1972 | Gulistan | 411/111 |
| 3,762,559 A | 10/1973 | Knoy et al. | |
| 3,873,136 A * | 3/1975 | Curry | 285/189 |
| 4,065,391 A * | 12/1977 | Farabaugh | 210/274 |
| 4,133,766 A * | 1/1979 | Adie | 210/275 |
| 4,878,782 A | 11/1989 | Beattie et al. | |
| 4,922,673 A * | 5/1990 | Ishii et al. | 52/220.1 |
| 5,019,259 A * | 5/1991 | Hambley | 210/274 |
| 5,226,748 A | 7/1993 | Barenwald et al. | |
| 5,263,676 A * | 11/1993 | Medlin et al. | 248/300 |
| 5,269,920 A * | 12/1993 | Brown et al. | 210/274 |

(Continued)

FOREIGN PATENT DOCUMENTS

WO   2008008951 A2   1/2008

*Primary Examiner* — Monica Millner
(74) *Attorney, Agent, or Firm* — The Webb Law Firm

(57) ABSTRACT

An underdrain flume plate for use in a filter including at least one central opening having an upstanding flange to interface with a cut-out in an underdrain lateral to form a passageway for connecting the lateral to the flume. The flume plate may also include at least one raised channel at each end of the plate with a solid or cut-away top surface, and/or holes and/or slots for connection of the flume plate to anchor rods and may be configured to overlap one another when placed side by side. The present invention also includes a method of installing underdrain laterals in a filter, including arranging a grid of anchor rods on a filter floor such that anchor rods are provided on both sides of the flume, and providing at least one underdrain flume plate adapted for attachment to the anchor rods such that the flume plate covers the flume.

16 Claims, 11 Drawing Sheets

(56) References Cited

U.S. PATENT DOCUMENTS

| | | | |
|---|---|---|---|
| 5,332,497 A * | 7/1994 | Shea et al. | 210/274 |
| 5,413,710 A * | 5/1995 | Roberts et al. | 210/274 |
| 5,489,388 A * | 2/1996 | Brown et al. | 210/794 |
| 5,546,716 A * | 8/1996 | Broxterman et al. | 52/220.1 |
| 5,618,426 A | 4/1997 | Eischen et al. | |
| 5,733,350 A * | 3/1998 | Muller et al. | 55/482 |
| 5,853,265 A * | 12/1998 | Gunter | 405/118 |
| 5,976,370 A * | 11/1999 | Medworth | 210/289 |
| 6,048,132 A | 4/2000 | Kupke et al. | |
| 6,090,284 A * | 7/2000 | Melber et al. | 210/274 |
| 6,143,188 A | 11/2000 | Jantsch, Sr. et al. | |
| 6,170,796 B1 * | 1/2001 | Gunter | 249/144 |
| 6,214,217 B1 * | 4/2001 | Sliger, Jr. | 210/167.19 |
| 6,261,453 B1 | 7/2001 | Savage | |
| 6,439,523 B1 * | 8/2002 | Chandler et al. | 248/300 |
| 6,583,357 B2 * | 6/2003 | Rubenstein et al. | 174/360 |
| 6,612,780 B2 * | 9/2003 | Dahowski et al. | 405/118 |
| 6,615,469 B1 * | 9/2003 | Burcham | 29/401.1 |
| 6,710,248 B1 * | 3/2004 | Foschino et al. | 174/651 |
| 6,797,166 B1 * | 9/2004 | Hambley et al. | 210/274 |
| 6,807,780 B2 * | 10/2004 | McCahill et al. | 52/220.8 |
| 6,830,684 B2 * | 12/2004 | Stegge | 210/274 |
| 6,860,678 B2 | 3/2005 | Gunter | |
| 6,991,726 B2 * | 1/2006 | St. Germain | 210/274 |
| 7,063,787 B2 * | 6/2006 | Jackson et al. | 210/274 |
| 7,074,329 B2 * | 7/2006 | Savage et al. | 210/293 |
| 7,090,771 B2 | 8/2006 | Dyson et al. | |
| 7,108,454 B2 * | 9/2006 | Blackwood | 405/36 |
| 7,290,958 B2 * | 11/2007 | Blackwood | 405/50 |
| 7,410,578 B2 * | 8/2008 | Hambley et al. | 210/289 |
| 7,481,930 B2 | 1/2009 | Roberts | |
| 7,490,600 B2 * | 2/2009 | Kopp | 126/82 |
| 7,736,506 B2 * | 6/2010 | Roberts et al. | 210/269 |
| 7,815,395 B1 * | 10/2010 | Blackwood | 405/50 |
| 8,077,449 B2 * | 12/2011 | Mi et al. | 361/679.21 |
| 8,177,970 B2 * | 5/2012 | Bradley et al. | 210/232 |
| 8,333,889 B2 * | 12/2012 | Roberts et al. | 210/274 |
| 8,343,343 B2 * | 1/2013 | Kadakia et al. | 210/232 |
| 8,413,734 B2 * | 4/2013 | Silcox et al. | 169/43 |
| 2003/0132169 A1 | 7/2003 | Hambley et al. | |
| 2004/0045899 A1 * | 3/2004 | Humphrey et al. | 210/620 |
| 2005/0109706 A1 * | 5/2005 | Hambley et al. | 210/744 |
| 2006/0186062 A1 | 8/2006 | Pauwels et al. | |
| 2008/0000825 A1 | 1/2008 | Roberts et al. | |
| 2010/0294902 A1 * | 11/2010 | Zhang et al. | 248/217.4 |

\* cited by examiner

UNDERDRAIN FLUME PLATE

CROSS REFERENCE TO RELATED APPLICATIONS

This application claims the benefit of U.S. Provisional Application No. 61/384,955, filed Sep. 21, 2010, the entire content of which is hereby incorporated by reference.

BACKGROUND OF THE INVENTION

1. Field of the Invention

The present invention relates to a gravity or pressure filter assembly that includes underdrain laterals and a bed of granular filter media. More particularly, the present invention relates to an underdrain flume plate used during installation to prevent grout from entering the flume.

2. Description of Related Art

Typical gravity or pressure filters use some type of filter media that captures the dirt particles from a liquid being filtered as the liquid passes through the media to an underdrain or collection system. Generally, beneath the filter media is a series of underdrain laterals consisting of underdrain laterals that are attached to the filter floor using a series of anchor rods, struts, and grouting. Such a filter may also have a flume, a deeper channel set into the floor of the filter through which backwash fluid and, optionally, air may be introduced into the filter. The underdrain laterals placed over the flume must therefore be in fluid communication with the flume to allow the backwash fluid to pass up through the underdrain laterals and the filter media. This is accomplished by the placement of openings in at least one of the underdrain blocks which make up the underdrain lateral. The underdrain blocks containing this opening are commonly referred to as flume blocks. The flume may be located on the front end of the filter or somewhere in the middle.

When installing a gravity filter, anchor rods placed in a grid pattern are firmly attached to the floor of the filter and struts are attached to the anchor rods to form a grid pattern on which the underdrain laterals sit. Grout is placed on the floor of the filter to fill in any space between the bottom of the underdrain lateral and the filter floor. However, it is necessary to keep the grout from running into the flume during installation of the underdrain laterals. A piece of bridging, a formed plastic trough, is used to hold grout or caulking against the bottom edge of the underdrain lateral to create the seal around the flume opening. The bridging must be pulled tight against the underdrain lateral and held in place with wire until the grout sets. It must also sit on some base grout to seal the bottom of the bridging to the filter floor. If the flume area is accessible, a worker enters the flume and pushes up on the bridging to ensure a good seal after the bridging has been wired to the underdrain lateral. This process is time consuming, messy, and often the effectiveness is less than desired as grout is able to leak into the flume.

SUMMARY OF THE INVENTION

The present invention is a flume plate for use in a gravity or pressure filter that is secured across the flume prior to installation of the underdrain laterals and grouting and prevents grout from entering the flume. The flume plate has at least one central opening having an upstanding flange to interface with a cut-out in an underdrain lateral to form a passageway for connecting the lateral to the flume. The flume plate may be wider than the underdrain lateral. The flume plate may include holes and/or slots for connection of the flume plate to anchor rods. It may also include at least one raised channel at each end of the plate, the respective channels defining channel openings therein. The channels may include holes and/or slots for connection of the flume plate to anchor rods and the top surface of the channels may be solid or cut away. The sides of the flume plate may also be configured such that they overlap one another when placed side-by-side. The flume plate may also include means for connecting air piping in the flume to an air chamber in the underdrain lateral. A vertical plate may also be placed on the sides of the flume abutting the bottom of the flume plate.

The present invention also includes a method of installing underdrain laterals in a filter having a flume including the steps of arranging a grid of anchor rods on a filter floor, and providing at least one underdrain flume plate adapted for attachment to the anchor rods such that the flume plate covers the flume. The inventive method may also include installing a plurality of flume plates wherein lateral edges of adjacent flume plates at least partially overlap, and installing struts before the installation of the flume plate. Underdrain laterals may be placed on top of the flume plates and grout may be used to seal any gaps between the flume plate and the filter floor and the flume plate and the underdrain lateral. In addition, the method may include attaching vertical plates to the walls of the flume such that the vertical plates abut a bottom surface of the underdrain laterals.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
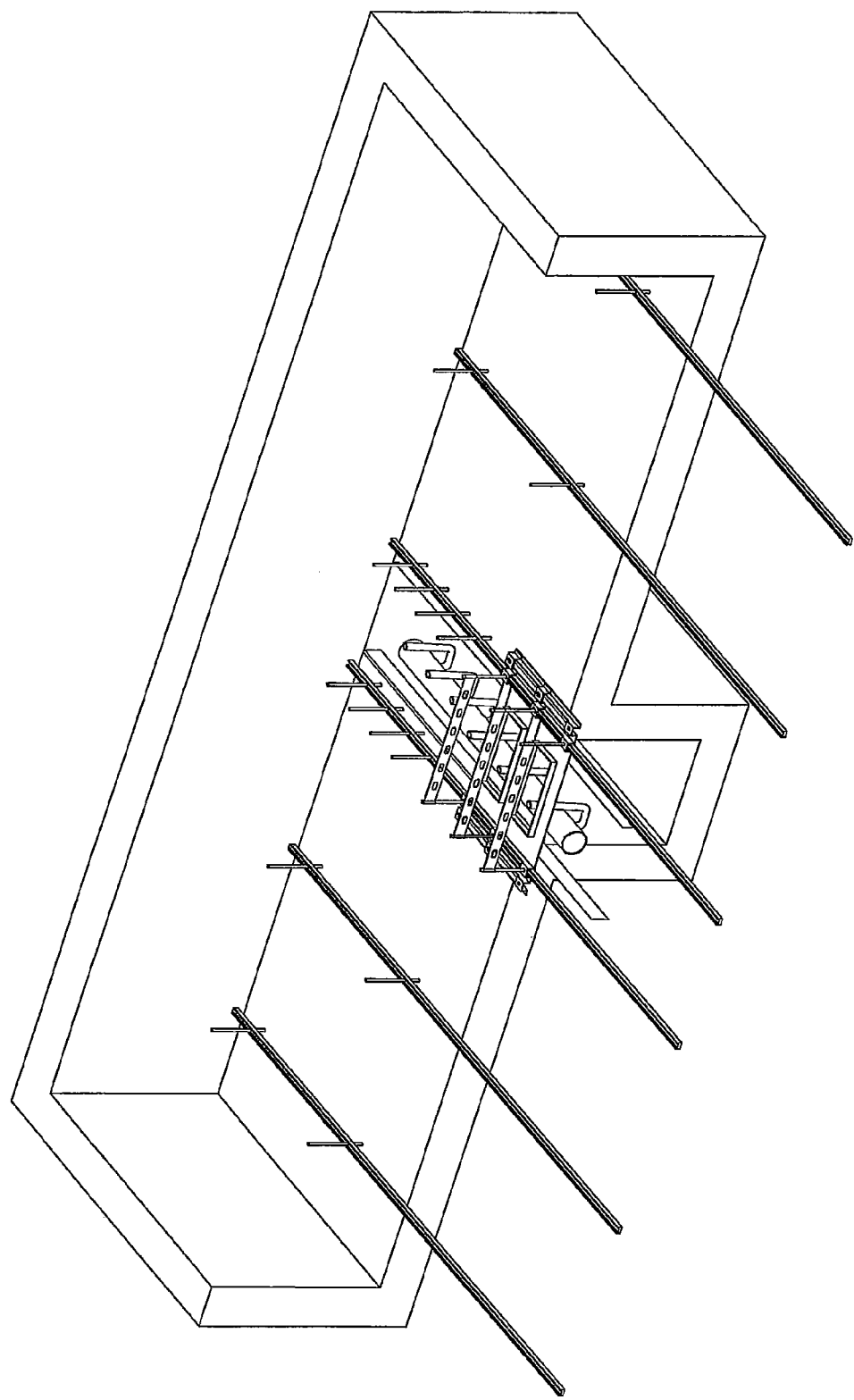
FIG. 1 shows a perspective view of one embodiment of the inventive underdrain flume plate with respect to the filter.

FIG. 1 shows an overview of one embodiment of the inventive underdrain flume plate as installed in the filter.

Figure 2:
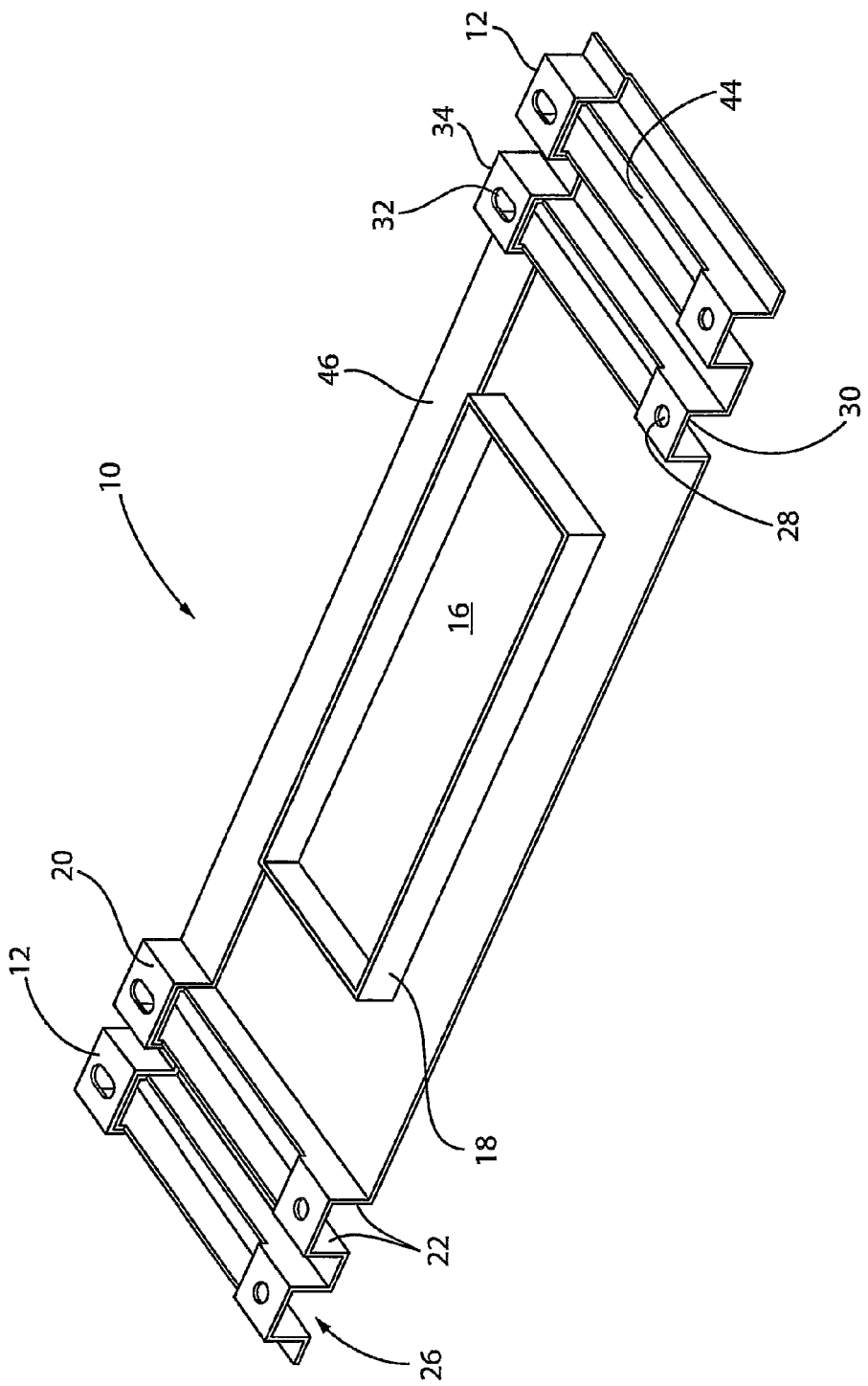
FIG. 2 shows a perspective view of one embodiment of the inventive underdrain flume plate.
Figure 3:
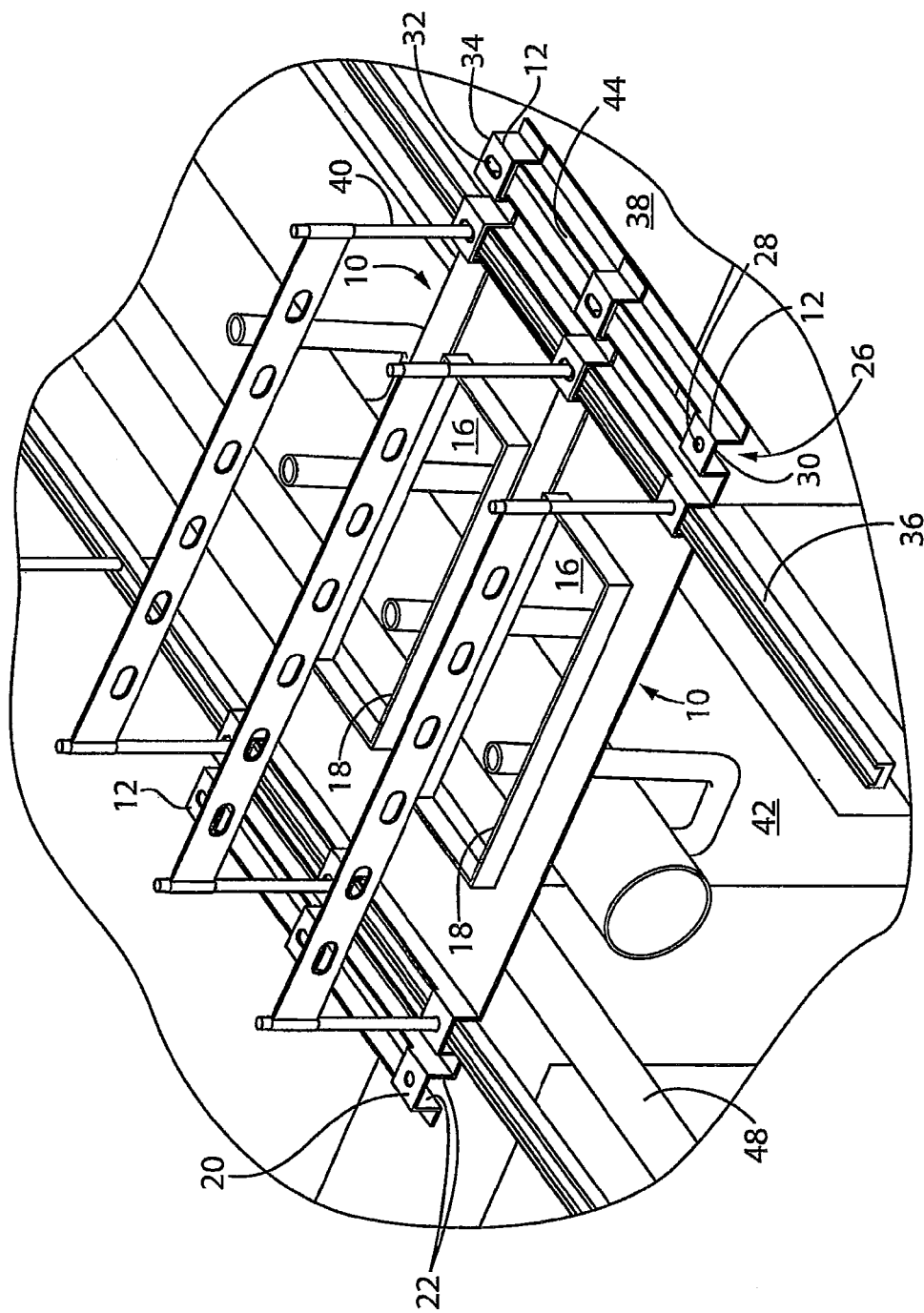
FIG. 3 shows a perspective view of the inventive underdrain flume plate shown in FIG. 2 after installation over the flume.

Referring to FIGS. 2 and 3, one embodiment of a flume plate 10 according to the present invention is shown. The flume plate 10 has at least one raised channel 12 on each end (two are shown in FIGS. 2 and 3), a central opening 16, and a flange 18 surrounding the central opening 16. The raised channels 12 have a top surface 20 and two sidewalls 22 defining a channel opening 26. A hole 28 is present in the top surface 20 of first end 30 of each channel 12 and a slot 32 is present in the top surface 20 of second end 34 of each channel 12. As shown in FIG. 3, the flume plate 10 is configured such that the channel opening 16 of each channel 12 fits over a strut 36 attached to a filter floor 38 by anchor rods 40 on opposing sides of the flume 42, and the hole 28 and slot 32 in first and second ends 30, 34 of the channels 12 align with and fit over the anchor rods 40, such that the flume plate 10 spans the flume 42. A portion 44 of the top surface 20 of the channels 12 may be recessed and open to allow the struts 36 to be exposed. The recessed and open portion 44 of the channels 12 is at least as wide as the underdrain lateral (not shown) that will be placed on top of the flume plate 10. This allows the underdrain lateral to rest on the struts 36 instead of the top surface 20 of the channels 12 creating a level surface for placement of the underdrain lateral which also rests on other struts 36 that do not have flume plates 10 placed over them.

While the channels 12 are generally U-shaped, they may have any shape that will fit over the strut 36 and may be adapted to the shape of the strut 36. They may also provide additional clearance for any excess anchor epoxy that forms around the base of the anchor rods 40. By providing more than one channel 12 on each end, the flume plate 10 may be used in different configurations having differing distances between the anchor rods 40 and the struts 36.

The flume plate 10 may also include a raised portion 46 on the second side 34 of the flume plate 10 which corresponds to the end of the channels 12 having a slot 32 in the top surface 20. The raised portion 46 may be raised a distance equal to about the thickness of the flume plate 10. The raised portion 46 is not only along the side of the plate but continues up the sidewalls 22 and over the top surface 20 of the channels 12. The raised portion 46 allows the flume plates 10 to be overlapped when they are placed side by side. The slots 32 allow the amount of overlap to be varied so that the placement of each flume plate 10 may be adjusted to correspond to the centerline of the underdrain lateral that is placed above it. This allows one configuration of flume plate 10 to be used with a variety of underdrain lateral configurations. The holes 28 assure consistent spacing of adjacent flume plates 10.

The flume plate 10 has at least one central opening 16 to allow fluid communication between an underdrain lateral (not shown) which will be mounted over the flume 42. The central opening 16 is surrounded on all sides by a raised flange 18. The size and shape of the central opening 16 may be configured to provide the necessary passageway between the underdrain lateral and the flume 42 and may be a single opening as shown in FIGS. 2 and 3 or a plurality of smaller openings each with its own respective flange 18. The flange 18 may be of sufficient height such that it will provide good contact with the bottom of the underdrain lateral to provide a seal that will keep grout from entering the flume 42 when the underdrain lateral is grouted to the filter floor 38. Alternatively, the flange 18 may be tall enough to extend into the opening in the bottom of the underdrain lateral.

The flume plate 10 may also include raised ridges (not shown) on the top and/or bottom surface of the plate to provide extra rigidity to support the weight of the grout and the underdrain lateral.

While it is not necessary to attach the flume plate 10 to the anchor rods 40 after the holes 28 and slots 32 have been placed over the anchor rods 40 because the underdrain lateral will hold the flume plate 10 in place, the flume plate 10 may be attached to the anchor rods 40 using nuts if the anchor rods 40 are threaded or any other suitable fastener, including, but not limited to, C-clips or clamps.

In order to level the flume plate 10 and the underdrain lateral placed above it, it is often necessary that some gaps be left between the flume plate 10 and the filter floor 38. Vertical plates 48 may be attached to the sides of the flume 42 such that they abut the bottom surface of the flume plate 10 creating a dam along each side of the flume 42 that keeps grout from running into the flume 42 through the gap between the flume plate 10 and the filter floor 38. The vertical plates 48 may be attached using masonary screws, such as Tapcon® screws, or any other suitable method.

Figure 4:
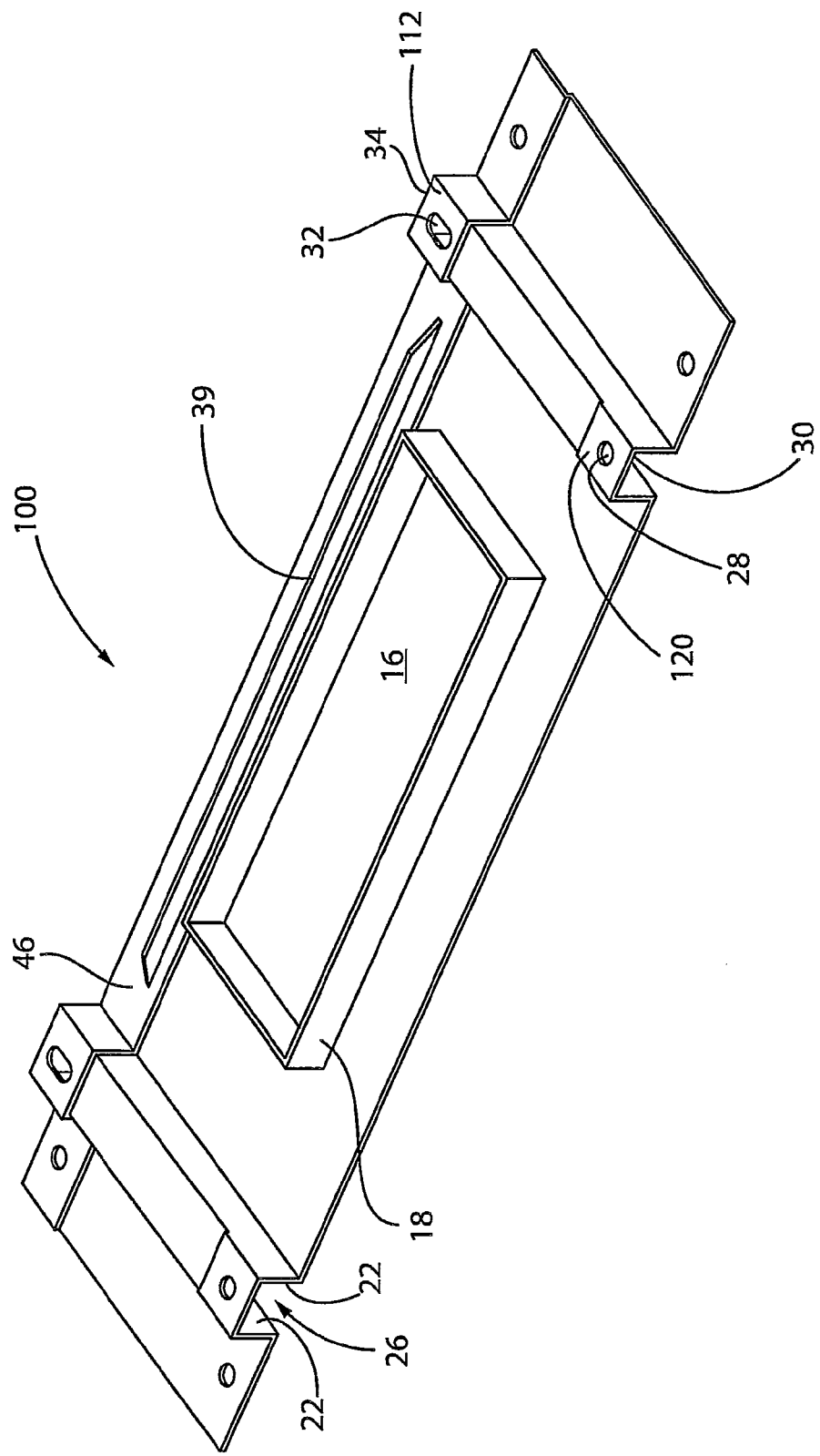
FIG. 4 shows a perspective view of another embodiment of the inventive underdrain flume plate.
Figure 5:
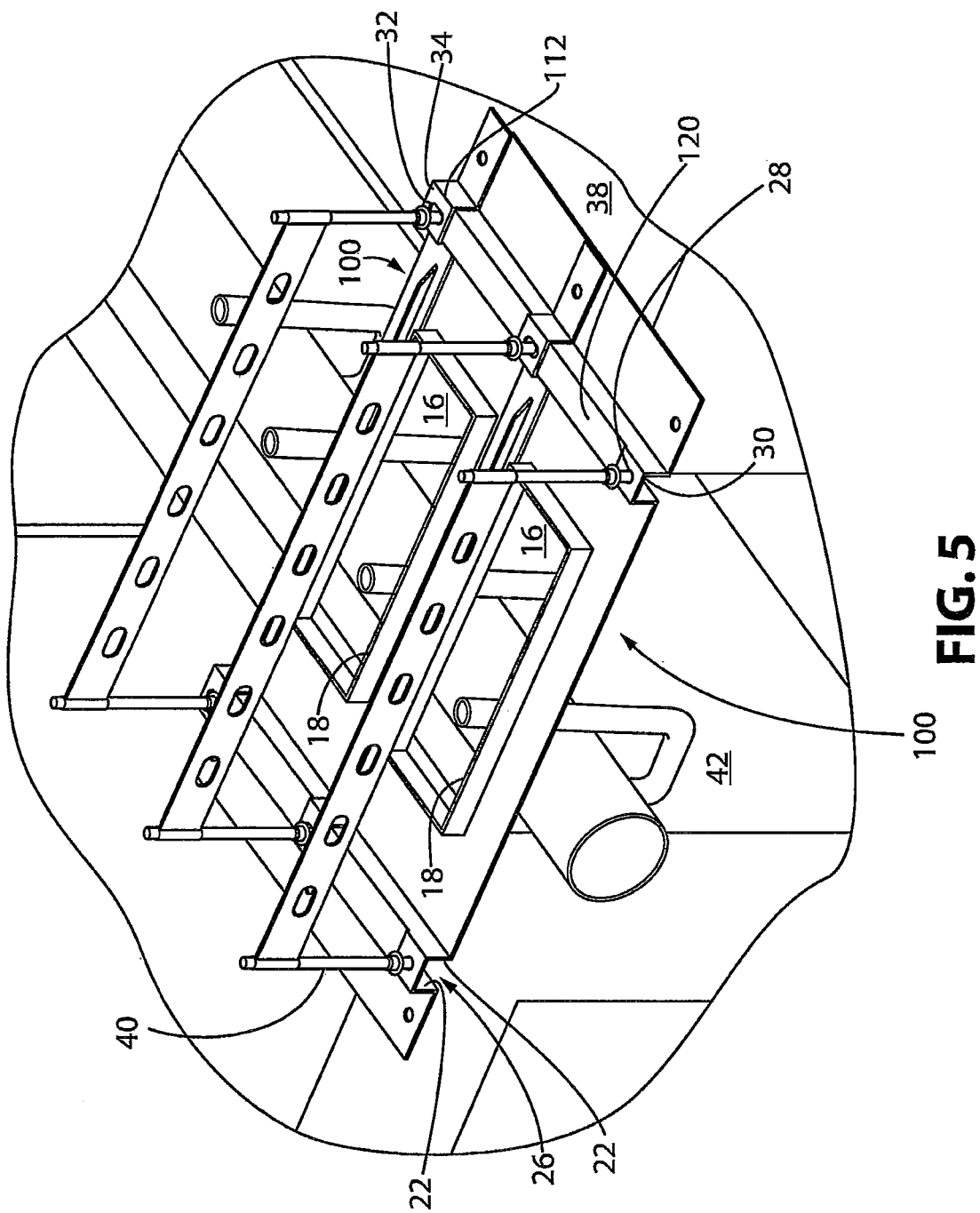
FIG. 5 shows a perspective view of the inventive underdrain flume plate shown in FIG. 4 after installation over the flume.

Another embodiment of the inventive flume plate 100 is shown in FIGS. 4 and 5. This embodiment has at least one channel 112 on each end. The top surface 120 of the channels 112 is solid. With this embodiment, no struts are used and the underdrain lateral (not shown) is placed directly on the channels 112 of the flume plate 100. This embodiment is particularly suited for use with conventional two-pour grouting.

The flume plate 100 may also include raised ridges 39 on the top and/or bottom surface of the plate to provide extra rigidity to support the weight of the grout and the underdrain lateral.

Figure 6:
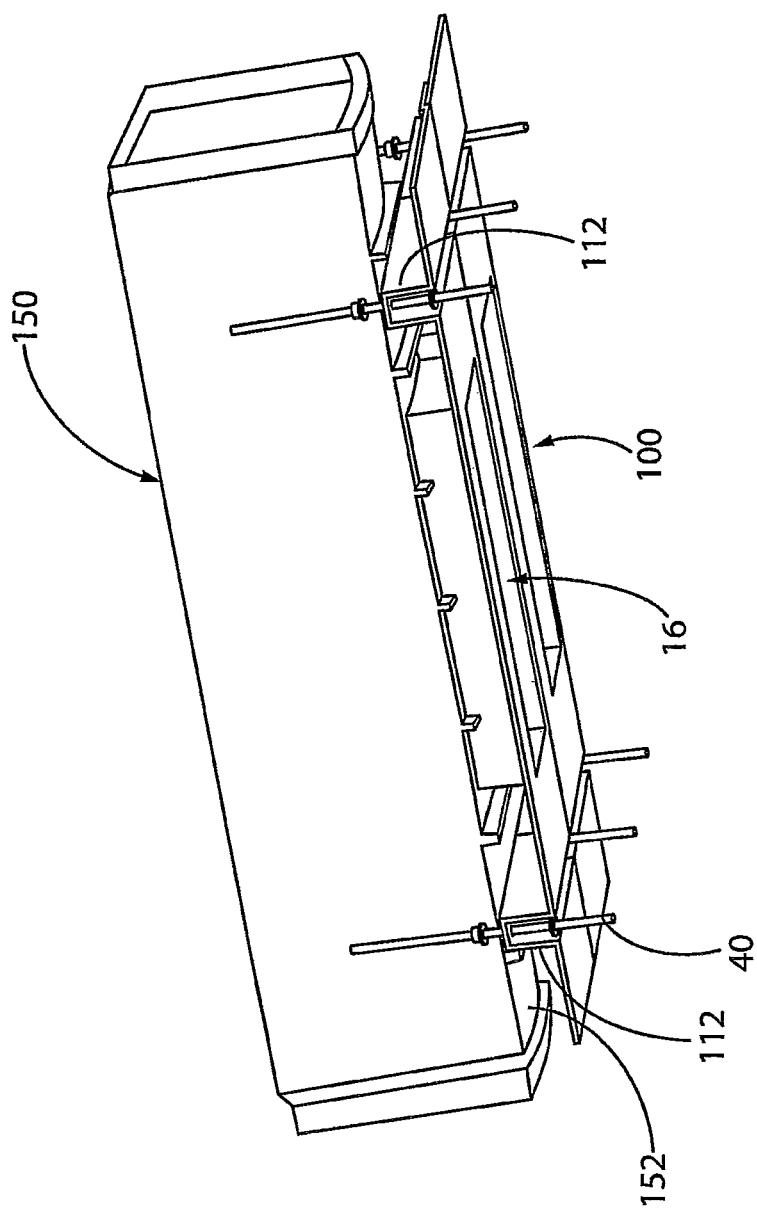
FIG. 6 shows a perspective view of the inventive underdrain flume plate shown in FIG. 4 with respect to an underdrain lateral.

FIG. 6 shows the relationship between the flume plate 100 and the flume block 150, which is the portion of the underdrain lateral that will be above the flume 42. The flume block 150 rests on the top surface 120 of the channels 112 and the flange 18 around the central opening 16 in direct contact or extending into the bottom surface 152 of the flume block 150.

Figure 7:
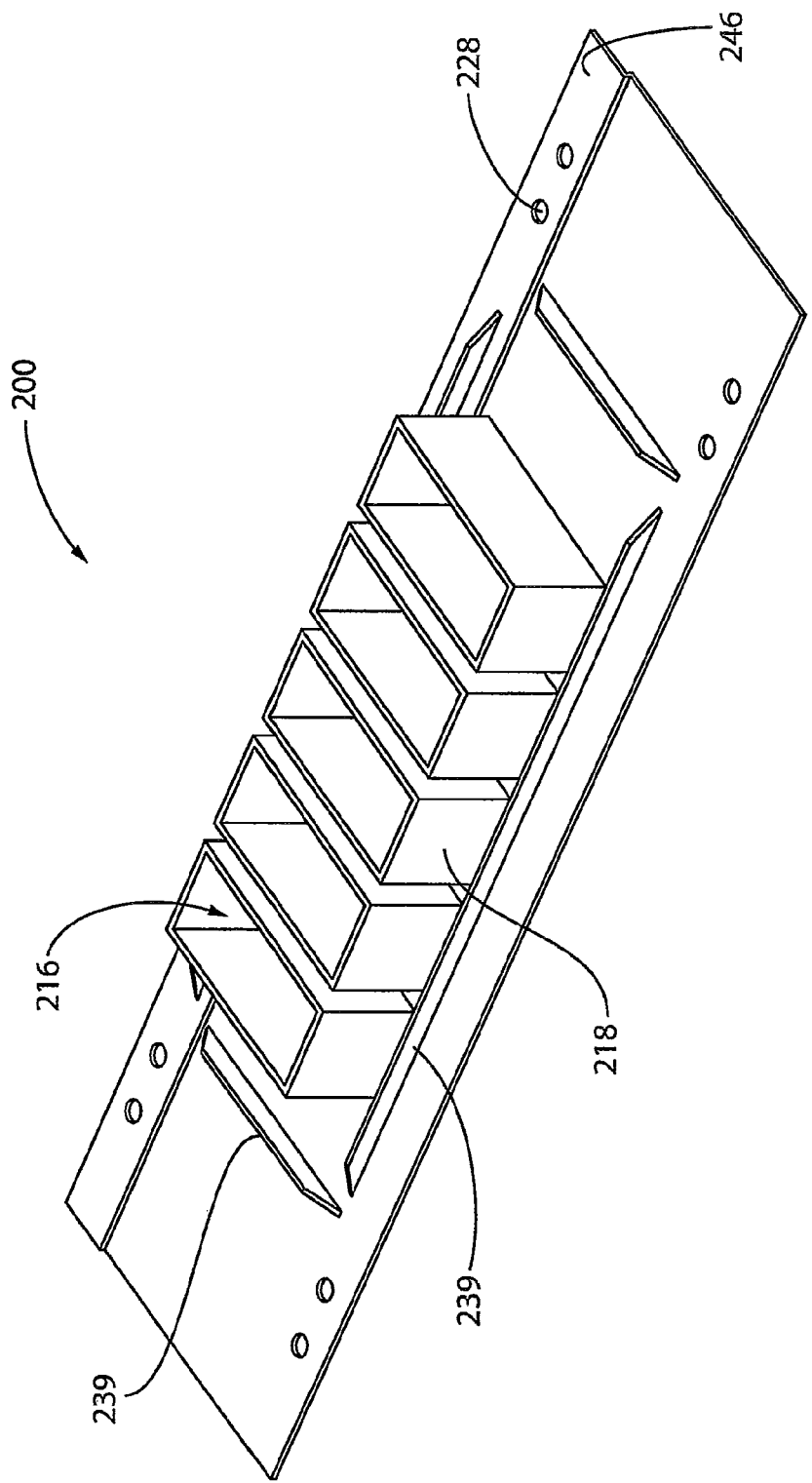
FIG. 7 shows a perspective view of another embodiment of the inventive underdrain flume plate.
Figure 10:
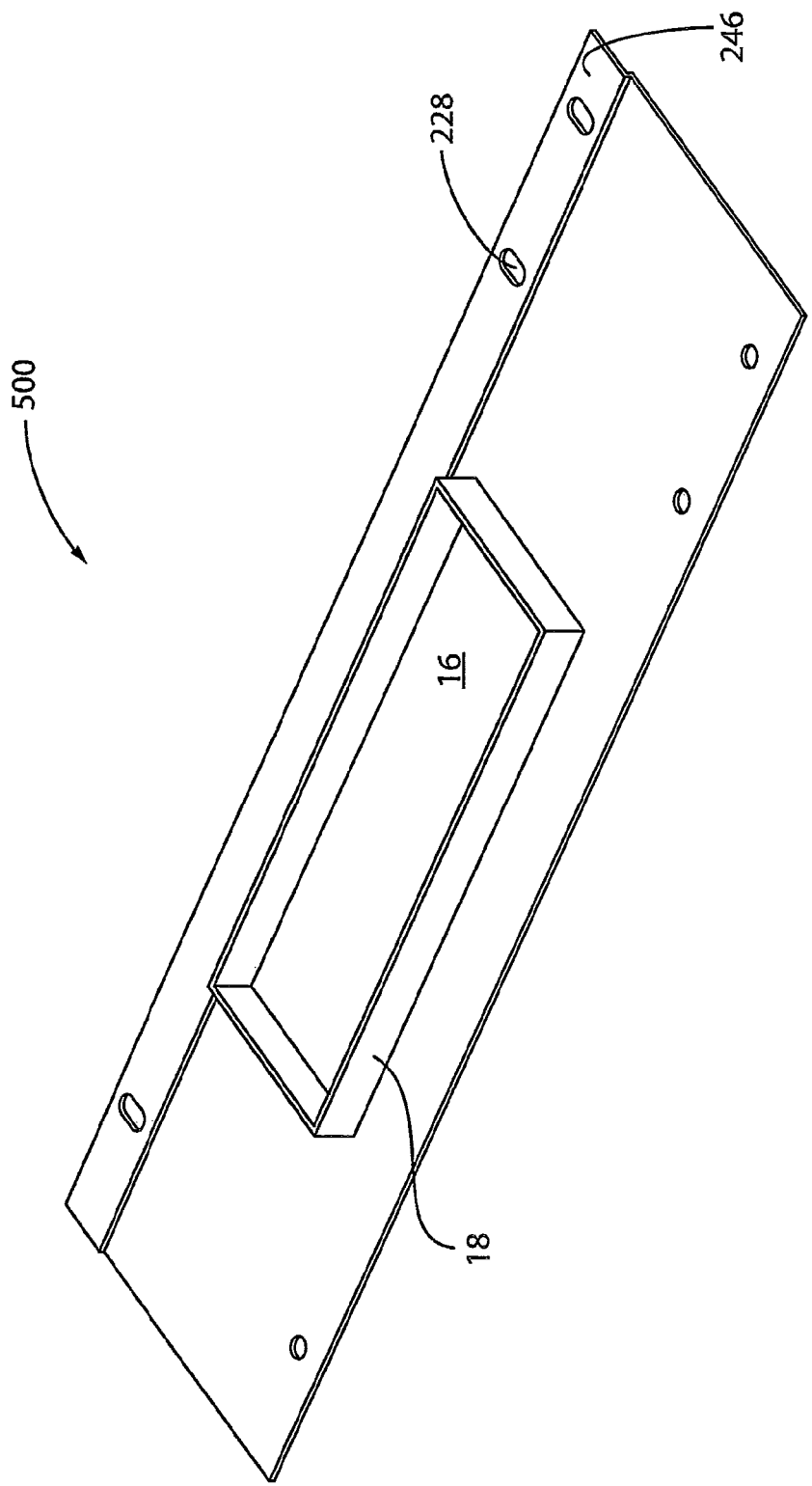
FIG. 10 shows a perspective view of another embodiment of the inventive underdrain flume plate.
Figure 11:
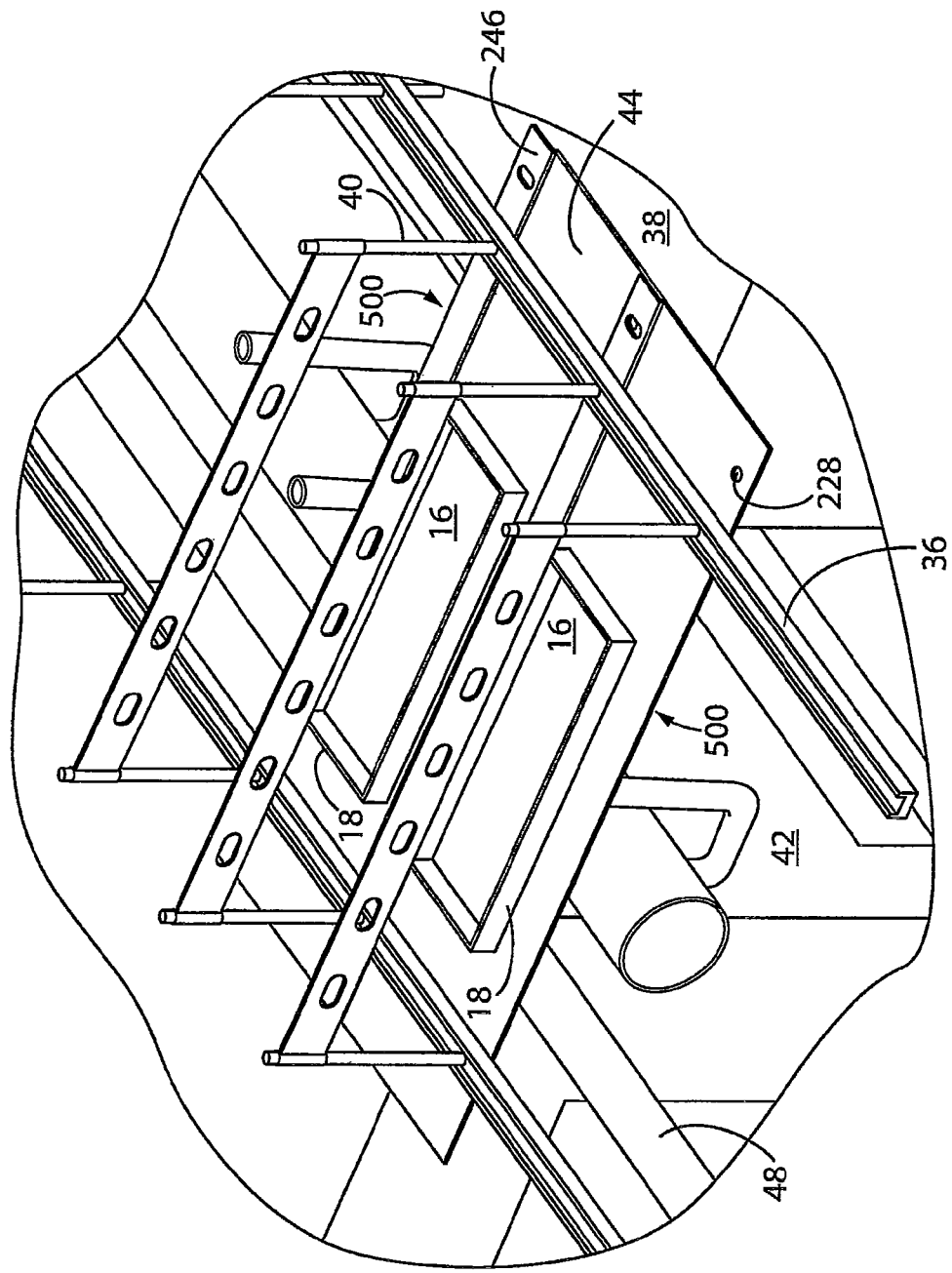
FIG. 11 shows a perspective view of the inventive underdrain flume plate shown in FIG. 10 after installation.

FIGS. 7 and 10 show two other embodiments of the inventive flume plate 200, 500. These embodiments do not utilize the channels 12, 112 that are present in flume plates 10, 100. The flume plate 200 may have multiple central openings 216 each surrounded by a respective flange 218, as shown in FIG. 7, or may have a single central opening 16 surrounded by a single flange 18, as shown in FIG. 10. Flume plate 200, 500 may have holes 228 at each end for attachment to the anchor rods (not shown) or may have a combination of holes and slots similar to flume plates 10, 100. Flume plate 200, 500 includes a raised portion 246 on the one side of the flume plate 200, 500. The raised portion 246 allows the flume plate 200, 500 to be overlapped when they are placed side by side. In addition, the flume plate 200 may include raised ridges 239 on the top and/or bottom surface of the plate to provide extra rigidity to support the weight of the grout and the underdrain lateral, as shown in FIG. 7. In these embodiments, the flume plate 200, 500 can be placed underneath the strut 36, as illustrated in FIG. 11. This provides more flexibility because the width of the flume is not a concern.

With any of the described embodiments, a bead of caulk may be used to seal the vertical plates 48 to the filter floor 38 along the edges of the flume 42, on the ends of the flume where the sides of the flume plates 10, 100, 200, 500 meet the sidewall of the filter, and/or along the overlap of the adjacent flume plates 10, 100, 200, 500 to seal them to one another in order to further prevent grout from entering the flume.

Figure 8:
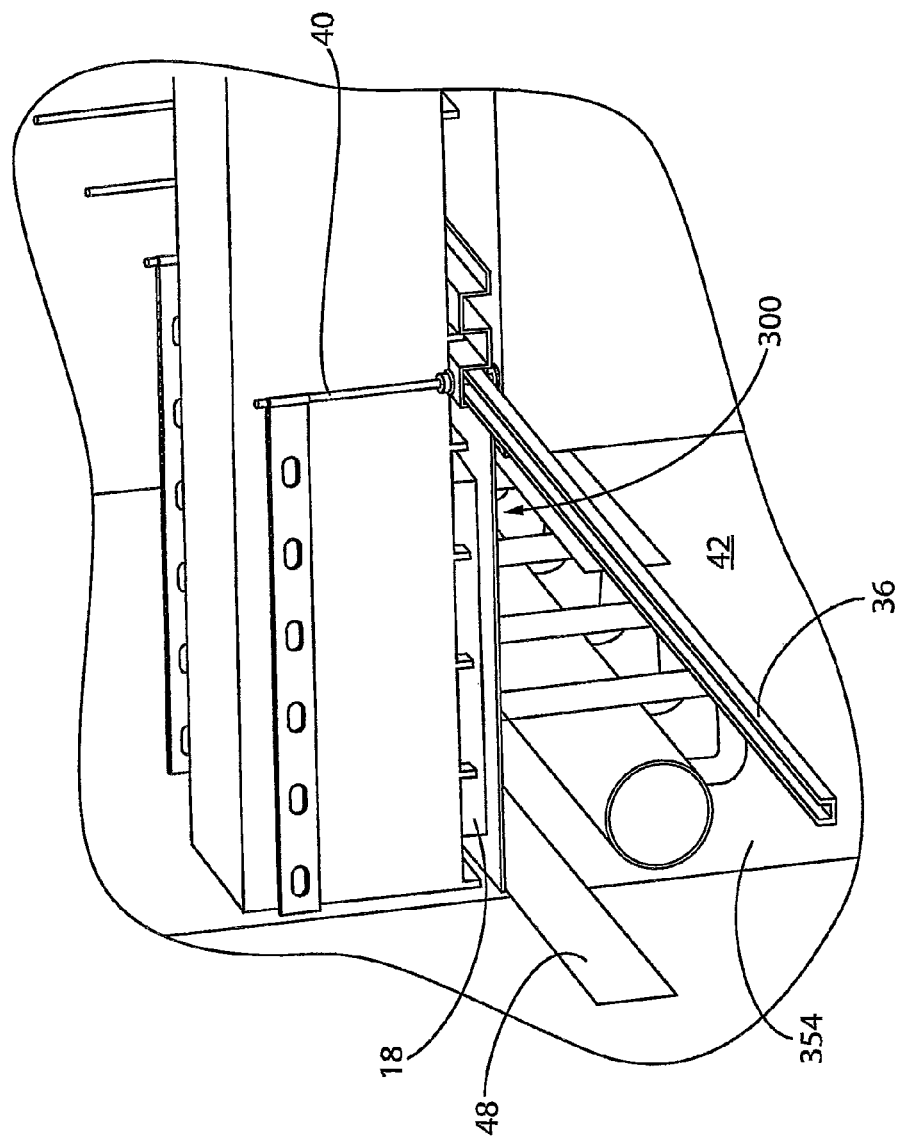
FIG. 8 shows a perspective view of another embodiment of the inventive underdrain flume plate.

While FIGS. 1-5 show a central flume, the inventive flume plates 10, 100, 200 may also be used with a front flume 42 when a ledge is provided at the outside wall 354. As shown in FIG. 8, if no ledge is provided at an outside wall 354 of the flume 42, the side of the flume plate 300 corresponding to the outside wall 354 may be made without the channels or be cut as necessary and secured to a vertical plate 48 attached to the outside wall 354 of the flume 42. Alternatively, a support (not shown), for example, an angle bracket, may be attached to the outside wall 354 of the flume 42 using anchors similar to those used in the filter floor 38, with masonary screws, such as Tapcon® screws, or by any other suitable means. The flume plate 300 is then secured to the support by bolting or any other suitable means.

Figure 9:
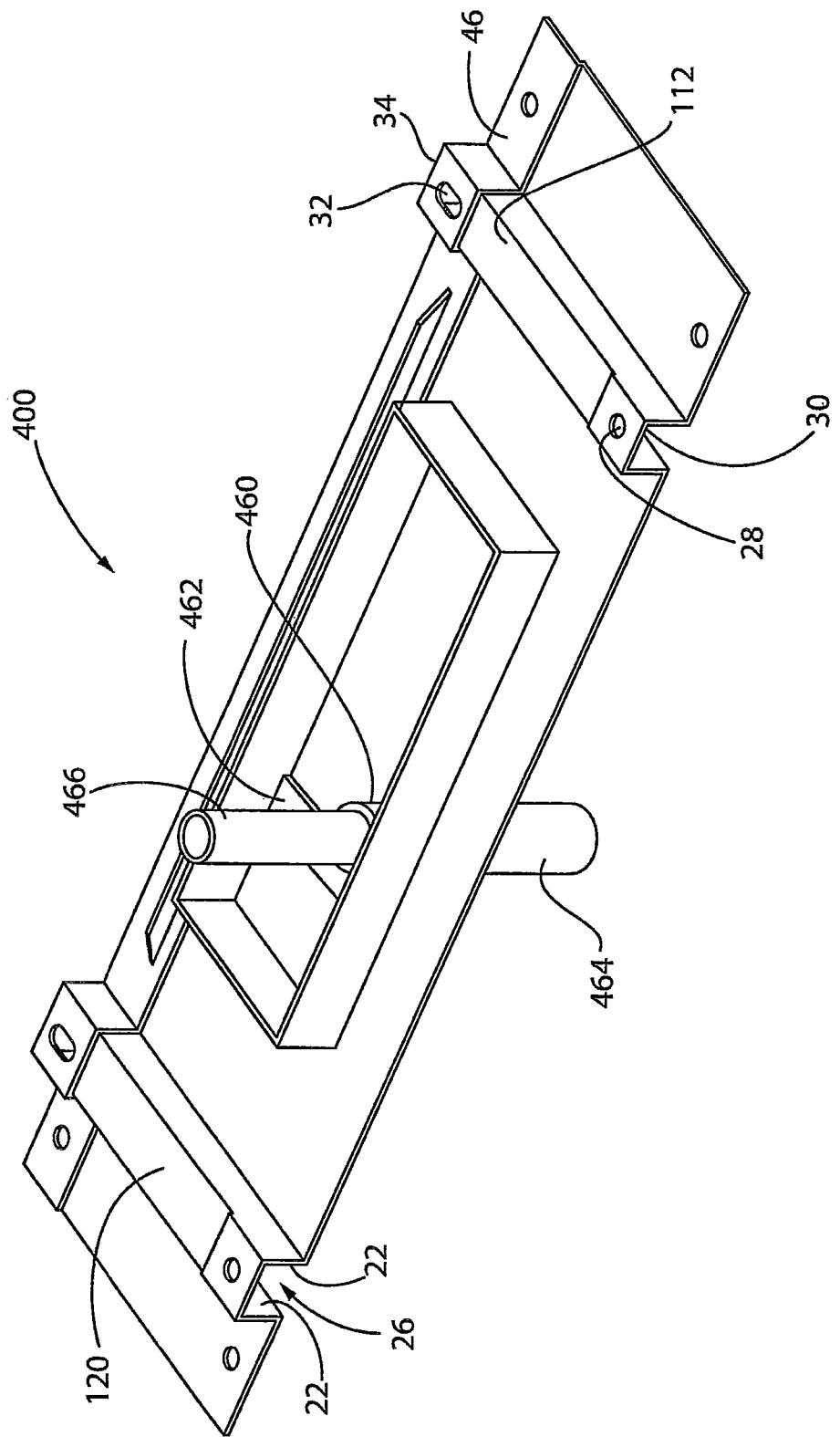
FIG. 9 shows a perspective view of another embodiment of the inventive underdrain flume plate.

In another embodiment, any of the flume plates described above may also include means for connecting air coming from piping within the flume 42 to an air chamber 464 within the flume block. In one embodiment, shown in FIG. 9, the flume plate 400 is similar to flume plate 100 as shown in FIGS. 4 and 5, but includes this additional feature. The connecting means includes, but is not limited to, a pipe 460 connected to the flume plate 400 via a tab 462. The connections to the air chamber 464 in the flume box and to the piping in the flume 42 may be hard connections, for example, metal or plastic pipe connectors or a combination of flexible hose and hose connections, or loose connections, for example, a large pipe loosely fitted over a smaller pipe. In the embodiment shown in FIG. 9, the connection to the air chamber 464 is adapted for a hard connection and the connection to air piping 466 is adapted for a loose connection.

The flume plates of the present invention may be molded as separate pieces or may be made integral to a flume block or underdrain block that is used to construct the underdrain laterals.

The present invention also includes a method of installing an underdrain lateral in a filter having a flume 42. A grid of anchor rods 40 is arranged in the filter floor 38 including a series of anchor rods 40 running along each side of the flume 42. At least one flume plate is placed over the flume 42 and attached to the anchor rods 40 on each side of the flume 42. Flume plates, as described above, may be used for this purpose. When such flume plates are used, the flume plate, such as flume plate 10, is placed over the flume 42 with the anchor rods 40 aligned with the holes 28 and/or slots 32. A second flume plate may be placed over the flume 42. When the flume plates having slots 32 on one side of the flume plate, as with flume plates 10, the slots 32 of the second flume plate are aligned with the same anchor rods 40 that the holes 28 in the first flume plate 10 are aligned with such that the sides of the flume plates overlap (see FIG. 5, for example). The holes 28 in the second flume plate are aligned with additional anchor rods 40. This progression may continue until the entire flume 42 has been covered by flume plates. While it is not necessary to attach the flume plate 10 to the anchor rods 40 after the holes 28 and slots 32 have been placed over the anchor rods 40 because the underdrain lateral will hold the flume plate 10 in place, the flume plates may be attached to the anchor rods 40 using nuts or other suitable attachment means, including, but not limited to, C-clips or clamps.

Vertical plates 48 may also be provided along the sides of the flume 42 such that they abut the bottom of the flume plates.

Grout may then be provided using a mono-pour or using conventional base grout. When using mono-pour grouting, after installation of the flume plates, such as flume plate 10, and the vertical plates 48, the laterals are leveled, positioned, and secured in place such that the flange 18 of the central opening 16 of the flume plate 10 contacts the bottom of the flume block 150 sealing around the opening in the flume block 150 provided for communication with the flume 42 or, alternatively, extending into the opening in the bottom of the flume block 150 (see FIG. 6, for example). Grout is poured into the bottom of the filter to fill the gap between the flume plate 10 and the filter floor 38 and the underdrain lateral and the flume plate 10 securing the underdrain lateral in place.

For conventional installation, struts 36 are provided parallel to the sides of the flume 42 extending between and attached to the anchor rods 40 and channels in the flume plate 10, 100, 400 are placed over both the anchor rods 40 and the struts 36 (see FIG. 3, for example). After installation of the flume plates 10, 100, 400 the base grout is placed in the bottom of the filter, using the flume plates 10, 100, 400 as a guide for the height. The underdrain laterals are then set into the filter, pushing the base grout down until the bottom of the lateral contacts the flume plate 10, 100, 400 or extends into the opening in the bottom of the underdrain lateral. The flume 42 will be sealed by the overlap on top and the base grout on the bottom. Side grout may be installed at a later time without the worry that grout will seep into the flume 42.

Alternatively, no struts are used and the flume plate is attached to the flume block 150 before the underdrain lateral is set into the base grout. This may be accomplished by molding the flume plate integral 10, 100, 200, 400, 500 to the flume block 150 or by attaching the flume plate 10, 100, 200, 400, 500 to the flume block 150 using screws or other suitable means.

With either mono-pour grouting or conventional grouting, a bead of caulk may be used to seal the vertical plates 48 to the filter floor 38 along the edges of the flume 42, on the ends of the flume 42 where the sides of the flume plates 10, 100, 200, 400, 500 meet the sidewall of the filter, and/or along the overlap of the adjacent flume plates 10, 100, 200, 400, 500 to seal them to one another in order to further prevent grout from entering the flume 42.

In addition, for both the mono-pour grouting and the conventional grouting, it is often necessary to provide grout between the underdrain lateral and the walls of the filter. In order to facilitate this process, a support, including, but not limited to, an angle bracket may be attached to the end wall of the flume in order to support the flume plate that abuts the filter wall at the end of the flume. This support may extend the entire distance between the sidewalls of the flume such that it seals any gaps between the flume plate and the filter wall in order to keep grout from entering the flume. The support may be attached to the end wall of the flume using anchors similar to those used in the filter floor, with masonary screws, such as Tapcon® screws, or by any other suitable means. The flume plate may then be secured to the support by bolting or any other suitable means.

While several embodiments of the invention were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. An underdrain flume plate having use in the installation of underdrain laterals, comprising:
   a plate member,
   wherein the plate member defines at least one central opening to interface with a cut-out in the underdrain lateral to form a passageway for connection to a flume and comprises an upstanding flange formed around all sides of the at least one central opening, wherein at least one side of the plate member is formed to overlap with an adjacent plate member to form a seal therebetween, and wherein the at least one side of the plate member includes a raised portion with holes or slots, said raised portion adapted to overlap the adjacent plate member.

2. The underdrain flume plate of claim 1, wherein each end of the plate member has an opening therethrough.

3. The underdrain flume plate of claim 2, wherein the opening through each end of the plate member is a hole or a slot.

4. The underdrain flume plate of claim 1, wherein the plate member is wider than the underdrain lateral.

5. The underdrain flume plate of claim 1, wherein the plate member further comprises at least one raised channel at each end of the plate member, the respective channels defining channel openings therein.

6. The underdrain flume plate of claim 5, wherein each end of a top surface of the at least one channel at each end of the plate member has an opening therethrough.

7. The underdrain flume plate of claim 6, wherein the opening through the top surface of the at least one channel at each end of the plate member is a hole or a slot.

8. The underdrain flume plate of claim 6, wherein additional clearance is provided in the channel opening in the areas corresponding to the openings in the top surface of the at least one channel at each end of the plate member.

9. The underdrain flume plate of claim 5, wherein the at least one channel at each end of the plate has a top surface and sidewalls defining the channel opening.

10. The underdrain flume plate of claim 9, wherein at least a portion of the top surface of the at least one channel at each end of the plate member is open and recessed.

11. The underdrain flume plate of claim 10, wherein the open and recessed portion of the top surface of the at least one channel at each end of the plate member is at least as wide as the underdrain lateral.

12. The underdrain flume plate of claim 1, wherein the plate member is integral to a bottom surface of a flume block or underdrain block.

13. The underdrain flume plate of claim 1, further comprising means for connecting air piping in the flume to an air chamber in the underdrain lateral.

14. The underdrain flume plate of claim 1, wherein the plate member further comprises raised ridges on a top surface, a bottom surface, or both to add rigidity to the flume plate.

15. An underdrain arrangement comprising:

a flume;

a plate member having at least one central opening and an upstanding flange formed around said at least one central opening, said plate member positioned above at least a portion of the flume; and at least one underdrain lateral positioned above the plate member, said underdrain lateral having at least one passageway interfacing with the upstanding flange and the at least one central opening of the plate member to provide a fluid connection between the flume and the underdrain.

16. The underdrain arrangement of claim 15, wherein at least one side of the plate member comprises a raised portion that is adapted to overlap with an adjacent plate member.

* * * * *